US010456734B2

(12) United States Patent
Tsujiuchi et al.

(10) Patent No.: US 10,456,734 B2
(45) Date of Patent: Oct. 29, 2019

(54) $CO_2$ RECOVERY SYSTEM AND METHOD OF RECOVERING $CO_2$

(71) Applicant: MITSUBISHI HEAVY INDUSTRIES, LTD., Tokyo (JP)

(72) Inventors: Tatsuya Tsujiuchi, Tokyo (JP); Takashi Kamijo, Tokyo (JP); Masayuki Inui, Tokyo (JP); Osamu Miyamoto, New York, NY (US)

(73) Assignee: MITSUBISHI HEAVY INDUSTRIES ENGINEERING, LTD., Kanagawa (JP)

( * ) Notice: Subject to any disclaimer, the term of this patent is extended or adjusted under 35 U.S.C. 154(b) by 0 days.

(21) Appl. No.: 15/340,391

(22) Filed: Nov. 1, 2016

(65) Prior Publication Data

US 2018/0117524 A1     May 3, 2018

(51) Int. Cl.
*B01D 53/14* (2006.01)
*B01D 53/18* (2006.01)
(Continued)

(52) U.S. Cl.
CPC ..... *B01D 53/1425* (2013.01); *B01D 53/1418* (2013.01); *B01D 53/1475* (2013.01);
(Continued)

(58) Field of Classification Search
None
See application file for complete search history.

(56) References Cited

U.S. PATENT DOCUMENTS

| 4,152,217 A | 5/1979 | Eisenberg et al. |
| 2011/0277479 A1 | 11/2011 | Richter et al. |

(Continued)

FOREIGN PATENT DOCUMENTS

| JP | 55-009079 A | 1/1980 |
| JP | 2003-225537 A | 8/2003 |

(Continued)

OTHER PUBLICATIONS

JP-2015077538-A English Translation (Year: 2015).*
(Continued)

*Primary Examiner* — Anita Nassiri-Motlagh
(74) *Attorney, Agent, or Firm* — Westerman, Hattori, Daniels & Adrian, LLP

(57) ABSTRACT

Included are a $CO_2$ absorber for removing $CO_2$ from a $CO_2$-containing flue gas with a $CO_2$ absorbent, an absorbent regenerator for regenerating the absorbent, a rich solution supply line for supplying the rich solution from the absorber to a rich solution supply portion of the regenerator, a rich/lean solution heat exchanger for exchanging heat between the rich solution and the lean solution, a first rich solution dividing line for dividing the rich solution at a first dividing portion in the rich solution supply line and supplying the divided rich solution at a first supply position on a side wall of the regenerator, a first rich solution heat exchanger for preheating the divided rich solution, and a first flow rate control device for controlling a flow rate of the divided rich solution such that the rich solution is preheated to a predetermined temperature in the first rich solution heat exchanger.

9 Claims, 10 Drawing Sheets

(51) Int. Cl.
   *B01D 53/62*   (2006.01)
   *B01D 53/78*   (2006.01)

(52) U.S. Cl.
   CPC .............. *B01D 53/18* (2013.01); *B01D 53/62* (2013.01); *B01D 53/78* (2013.01); *B01D 2252/204* (2013.01); *B01D 2257/504* (2013.01); *Y02A 50/2342* (2018.01); *Y02C 10/04* (2013.01); *Y02C 10/06* (2013.01)

(56) References Cited

U.S. PATENT DOCUMENTS

| | | | |
|---|---|---|---|
| 2013/0023315 A1 | 1/2013 | Gilula | |
| 2015/0027164 A1* | 1/2015 | Ogawa | F25J 3/00 62/617 |
| 2016/0256816 A1 | 9/2016 | Tanaka et al. | |
| 2016/0296879 A1 | 10/2016 | Baek et al. | |

FOREIGN PATENT DOCUMENTS

| | | | | |
|---|---|---|---|---|
| JP | 2009-214089 A | | 9/2009 | |
| JP | 2012-516226 A | | 7/2012 | |
| JP | 2013-184090 A | | 9/2013 | |
| JP | 2015-077538 A | | 4/2015 | |
| JP | 2015077538 A | * | 4/2015 | ......... B01D 19/0015 |

OTHER PUBLICATIONS

International Search Report dated Dec. 5, 2017, issued in counterpart International Application No. PCT/JP2017/035601, with English translation (6 pages).
Written Opinion dated Dec. 5, 2017, issued in counterpart Application No. PCT/JP2017/035601, with English Translation (12 pages).

* cited by examiner

$CO_2$ RECOVERY SYSTEM AND METHOD OF RECOVERING $CO_2$

FIELD

The present invention relate to an energy-saving $CO_2$ recovery system and a method of recovering $CO_2$.

BACKGROUND

In recent years, the greenhouse effect due to $CO_2$ is pointed out as a factor of global warming, and thus the measure to cope with this has become an international urgent task in order to protect the global environment. The $CO_2$ generation sources include a various fields of human activities that burn fossil fuels, and a demand for emission limitation of $CO_2$ tends to be even stronger. In association with this, a method to remove and recover $CO_2$ in the flue gas by bringing the flue gas from a boiler into contact with an amine-based $CO_2$ absorbent for example and a method to store the recovered $CO_2$ without releasing it to the atmosphere has been extensively investigated by taking the power generation facilities such as thermal power plants that use great amounts of fossil fuels as the target.

As the method of removing and recovering $CO_2$ from a flue gas using a $CO_2$ absorbent, the following method has been employed. That is, a flue gas is brought into contact with a $CO_2$ absorbent in an absorber, the absorbent which has absorbed $CO_2$ is heated in a regenerator to release $CO_2$ and regenerate the absorbent, and the regenerated absorbent is circulated again in the absorber to be reused (Patent Literature 1: Japanese Patent Application Laid-open No. 2003-225537).

In a method of absorbing, removing, and recovering $CO_2$ from a $CO_2$-containing gas such as a flue gas, it is necessary to add an absorber and a regenerator to a fuel facility for installation. Therefore, cost other than installation cost, for example, operation cost has to be reduced as much as possible. Particularly, when an absorbent is regenerated, a large amount of heat energy (water vapor) is consumed in order to release $CO_2$ from a $CO_2$ absorbent, and therefore a regeneration process needs to be an energy-saving process if possible.

Therefore, the following carbon dioxide recovery system has been conventionally proposed (Patent Literature 2: Japanese Patent Application Laid-open No. 2009-214089). That is, the carbon dioxide recovery system includes a dividing device for dividing a rich solution discharged from an absorber into a first heat exchanger for cooling a lean solution and a second heat exchanger for cooling carbon dioxide-containing vapor. The rich solutions introduced into the first heat exchanger and the second heat exchanger exchange heat with the lean solution and the carbon dioxide-containing vapor, respectively, and then are supplied to a regenerator for releasing $CO_2$.

However, the proposal in Patent Literature 2 has the following problem. That is, the rich solution which has absorbed $CO_2$ is divided on a former stage side of the lean/rich solution heat exchanger as the first heat exchanger, the divided rich solution is supplied to the regenerator while being heated by heat exchange with carbon dioxide-containing vapor discharged from a top of the regenerator, but the divided rich solution is supplied to an upper portion than the rich solution, therefore satisfactory regeneration cannot be performed when the divided rich solution is heated insufficiently, and stable energy-saving cannot be performed. In addition, the absorbent is circulated again, and therefore a cooling efficiency of the lean solution by the rich solution in the lean/rich solution heat exchanger is reduced disadvantageously when a part of the rich solution is divided and extracted on a former stage side of the lean/rich solution heat exchanger. As a result, it is necessary disadvantageously to increase cooling ability to cool the lean solution in a cooler provided before introduction to the absorber.

SUMMARY

According to the first embodiment, it is provide that a $CO_2$ recovery system including a $CO_2$ absorber that brings a $CO_2$-containing flue gas containing $CO_2$ with a $CO_2$ absorbent and removes $CO_2$ from the $CO_2$-containing flue gas, an absorbent regenerator that separates $CO_2$ from a rich solution which has absorbed $CO_2$ and regenerates the $CO_2$ absorbent as a lean solution, a rich solution supply line that supplies the rich solution from a bottom of the $CO_2$ absorber to a rich solution supply portion on a top side of the absorbent regenerator, a rich/lean solution heat exchanger that exchanges heat between the rich solution and the lean solution, a first rich solution dividing line that divides a part of the rich solution at a first dividing portion in the rich solution supply line provided between the rich/lean solution heat exchanger and the absorbent regenerator and supplies the divided rich solution at a first supply position on a side wall closer to a bottom side than the top side of the absorbent regenerator, a first rich solution heat exchanger that preheats the rich solution divided at the first dividing portion, provided in the first rich solution dividing line, and a first flow rate control device that controls a flow rate of the rich solution divided at the first dividing portion such that the rich solution is preheated to a predetermined temperature in the first rich solution heat exchanger, provided between the first dividing portion in the first rich solution dividing line and the first rich solution heat exchanger.

According to the second embodiment of the invention, it is provided that a method of recovering $CO_2$ for circulating and reusing, using a $CO_2$ absorber for bringing a $CO_2$-containing fine gas containing $CO_2$ with a $CO_2$ absorbent and removing $CO_2$ from the $CO_2$-containing flue gas and an absorbent regenerator for separating $CO_2$ from a rich solution as a $CO_2$ absorbent which has absorbed $CO_2$ and regenerating the $CO_2$ absorbent as a lean solution, the $CO_2$ absorbent from which $CO_2$ has been removed by the absorbent regenerator in the $CO_2$ absorber, including exchanging heat between the rich solution fed from the $CO_2$ absorber and the lean solution fed from the absorbent regenerator, dividing the rich solution which has been subjected to heat exchange in order to supply the rich solution to a rich solution supply portion on a top side of the absorbent regenerator and a side wall positioned on a lower side of the rich solution supply portion, and preheating the rich solution supplied to a supply position on the side wall, wherein in the process of dividing the rich solution which has been subjected to heat exchange, an amount of the rich solution divided for heat exchange is adjusted such that a temperature of the rich solution which has been supplied from the rich solution supply portion on the top side of the absorbent regenerator and from which a part of $CO_2$ has been removed is the same as or higher than that of the divided rich solution supplied from the side wall of the absorbent regenerator.

DESCRIPTION OF EMBODIMENTS

Hereinafter, the present invention will be described in detail with reference to the drawings. Note that the present invention is not limited by the following Examples of the present invention. A constituent element in the following Examples includes an element which can be conceived of easily by a person skilled in the art, substantially the same element, and an element within a so-called equal range. Furthermore, constituent elements disclosed in the following Examples can be combined with one another appropriately.

An object of an embodiment of the present invention is to provide a $CO_2$ recovery system and a method of recovering $CO_2$ which have an energy efficiency further improved with stable energy-saving.

According to an embodiment of the present invention, when a divided rich solution is preheated and then is supplied at a first supply position in a regenerator, an amount of the rich solution divided is adjusted by a flow rate adjuster, and the divided rich solution is preheated and introduced such that a temperature of the divided rich solution is approximately the same as or lower than that of a rich solution from which a part of $CO_2$ has been removed in the regenerator. Therefore, variation in temperature of the joined solutions in the regenerator does not occur, $CO_2$ is released efficiently, and a high energy-saving effect can be obtained. As a result, it is possible to reduce the amount of vapor necessary for a reboiler and the amount of cooling water necessary in a lean solution cooler for cooling a lean solution to be introduced into a $CO_2$ absorber.

Example 1

Figure 1:
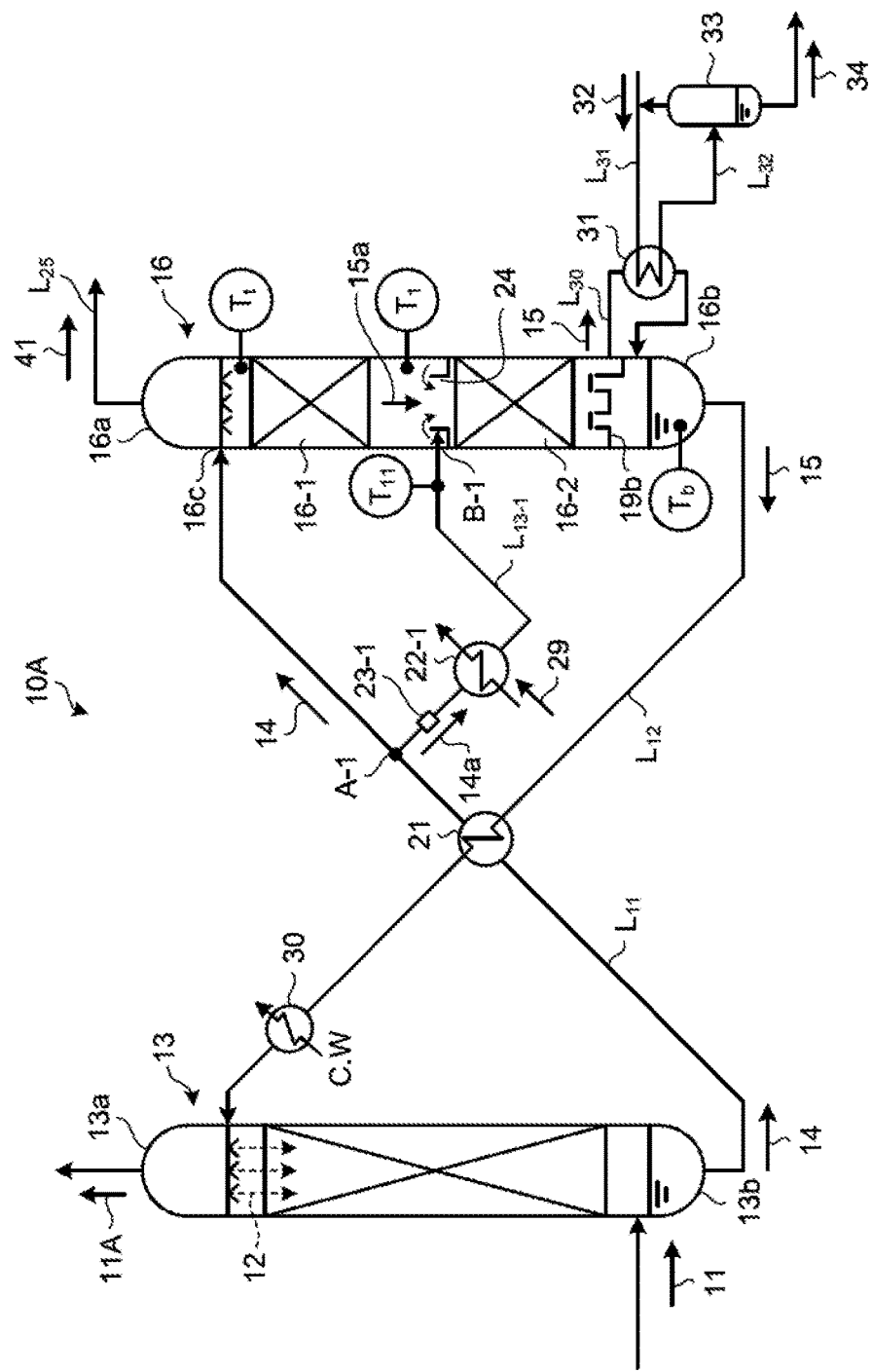
FIG. 1 is a schematic diagram illustrating a configuration of a $CO_2$ recovery system according to Example 1.

FIG. 1 is a schematic diagram illustrating a configuration of a $CO_2$ recovery system according to Example 1. As illustrated in FIG. 1, a $CO_2$ recovery system 10A according to the present Example includes a $CO_2$ absorber (hereinafter, referred to as "absorber") 13 for bringing a $CO_2$-containing flue gas 11 containing $CO_2$ with a $CO_2$ absorbent 12 and removing $CO_2$ from the $CO_2$-containing flue gas (hereinafter, "flue gas") 11, an absorbent regenerator (hereinafter, referred to as "regenerator") 16 for separating $CO_2$ from a rich solution 14 which has absorbed $CO_2$ and regenerating the $CO_2$ absorbent as a lean solution to obtain a lean solution 15, a rich solution supply line $L_{11}$ for supplying the rich solution 14 from a bottom 13b of the absorber 13 to a rich solution supply portion 16c around a top 16a side of the regenerator 16, a rich/lean solution heat exchanger 21 for exchanging heat between the rich solution 14 and the lean solution 15, a first rich solution dividing line $L_{13\text{-}1}$ for dividing a part of the rich solution 14 at a first dividing portion A-1 in the rich solution supply line $L_{11}$ provided between the rich/lean solution heat exchanger 21 and the regenerator 16 and supplying the divided rich solution 14a at an introduction portion 24 at a first supply position B-1 on a side wall closer to a bottom 16b side than the rich solution supply portion 16c in the regenerator 16, a first rich solution heat exchanger 22-1 for preheating the rich solution 14a divided at the first dividing portion A-1, provided in the first rich solution dividing line $L_{13\text{-}1}$, and a first flow rate control device 23-1 for controlling a flow rate of the rich solution 14a divided at the first dividing portion A-1 such that the rich solution 14a is preheated to a predetermined temperature in the first rich solution heat exchanger 22-1, provided between the first dividing portion A-1 in the first rich solution dividing line $L_{13\text{-}1}$ and the first rich solution heat exchanger 22-1.

By preheating the divided rich solution 14a by the first rich solution heat exchanger 22-1, while adjusting a ratio of the divided rich solution 14a by controlling the first flow rate control device 23-1, such that an introduction temperature $t_{11}$ of the preheated divided rich solution 14a is the same as a temperature $t_1$ of a semi-lean solution 15a which is the rich solution 14 obtained by eliminating $CO_2$ from the rich solution 14 falling in the regenerator 16 at the first supply position B-1 at which the divided rich solution 14a is introduced into the regenerator 16, the introduction temperature $t_{11}$ of the preheated divided rich solution 14a is made to be approximately the same as the temperature $t_1$ of the semi-lean solution 15a in the regenerator 16.

Here, in FIG. 1, the sign 30 represents a lean solution cooler for cooling the lean solution 15 to be introduced into the absorber 13 with cooling water (CW), provided in a lean solution supply line $L_{12}$, the sign 31 represents a reboiler for introducing water vapor into the regenerator 16 by heating the lean solution 15 indirectly with saturated water vapor 32, provided in the regenerator 16, the sign 33 represents a gas-liquid separator for separating steam condensate 34 from the heated saturated water vapor 32, the sign $L_{30}$ represents a lean solution circulation line in which a part of the lean solution 15 is circulated with the reboiler 31 provided, the sign $L_{31}$ represents a saturated water vapor introduction line for introducing the saturated water vapor 32 into the reboiler 31, and the sign $L_{32}$ represents a steam condensate supply line for supplying the steam condensate 34.

In a method of recovering $CO_2$ using this $CO_2$ recovery system, first, the flue gas 11 containing $CO_2$ derived, for example, from a boiler or a gas turbine is cooled by a gas cooler (not illustrated), and is sent to the absorber 13.

In the absorber 13, the flue gas 11 countercurrently comes into contact with the $CO_2$ absorbent 12 containing an amine solution as a base, for example. $CO_2$ in the flue gas 11 is absorbed by the $CO_2$ absorbent 12 by a chemical reaction. The $CO_2$-removed flue gas obtained by absorption of $CO_2$ and removal thereof in the absorber 13 is subjected to gas-liquid contact with cleaning water in a water cleaning portion (not illustrated) in the absorber 13, the $CO_2$ absorbent 12 accompanying the $CO_2$-removed flue gas is recovered, and then a $CO_2$-removed flue gas 11A obtained by removing $CO_2$ is released from the top 13a to an outside of the system. A pressure of the rich solution 14 as the $CO_2$ absorbent 12 which has absorbed $CO_2$ is raised by a rich solution pump (not illustrated). The rich solution 14 is heated by the lean solution 15 as the $CO_2$ absorbent 12 which has been regenerated in the regenerator 16 (while the lean solutions 15 is cooled by heat exchange) in the rich/lean solution heat exchanger 21, and is supplied to the regenerator 16.

The rich solution 14 which has been released from the rich solution supply portion 16c of the regenerator 16 into an inside thereof causes an endothermic reaction due to water vapor supplied from the bottom 16b side, and eliminates and releases a large part of $CO_2$. The $CO_2$ absorbent which has released a part or a large part of $CO_2$ in the regenerator 16 is referred to as the semi-lean solution 15a. This semi-lean solution 15a becomes the lean solution 15 of a $CO_2$ absorbent obtained by removing almost all of $CO_2$ by the time it reaches the bottom 16b of the regenerator 16. A part of this lean solution 15 is heated by the saturated water vapor 32 in the reboiler 31 to supply water vapor into the regenerator 16.

On the other hand, a $CO_2$ gas 41 accompanied by water vapor released from the rich solution 14 and the semi-lean solution 15a in the regenerator is discharged from the top 16a of the regenerator 16 through a gas discharge line $L_{25}$. Thereafter, the water vapor is condensed by a condenser, and water is separated by a separation drum. The $CO_2$ gas 41 which has been separated by the separation drum is released to an outside of the system through the gas discharge line $L_{25}$, is compressed separately by a compressor, and is recovered. This recovered $CO_2$ gas 41 is pressed into an oil field, for example, using enhanced oil recovery (EOR), or stored in an aquifer to take warming measures.

The lean solution 15 as the $CO_2$ absorbent which has been regenerated is cooled by heat exchange with the rich solution 14 in the rich/lean solution heat exchanger 21. Subsequently, a pressure of the lean solution 15 is raised by a lean solution pump (not illustrated). Furthermore, the lean solution 15 is cooled in a lean solution cooler 30, and then is supplied into the absorber 13 to be circulated and reused as the $CO_2$ absorbent 12.

In the present Example, a part of the rich solution 14 which has absorbed $CO_2$ in the absorber 13 is divided at the first dividing portion A-1 provided on a later stream side of the rich/lean solution heat exchanger 21. By disposing the first rich solution heat exchanger 22-1 for preheating the divided rich solution 14a by heat exchange with a heat medium (for example, water vapor) 29 having a higher temperature than the divided rich solution 14a, the divided rich solution 14a is preheated, and then is introduced into surrounding of a middle stage of the regenerator 16.

Examples of the heat medium 29 of the first rich solution heat exchanger 22-1 include water vapor, the steam condensate 34 from the reboiler 31, and a heat medium which has exchanged heat indirectly with a boiler flue gas.

Here, a base portion of the first rich solution dividing line $L_{13-1}$ is connected to the first dividing portion A-1, and an end thereof is connected to a side wall of the regenerator 16.

In the regenerator 16, when the rich solution 14 which has been supplied from the rich solution supply portion 16c by the rich solution supply line $L_{11}$ is introduced into the regenerator 16, $CO_2$ is eliminated and removed from the rich solution 14 by water vapor rising from the bottom 16b of the regenerator 16. Subsequently, as the rich solution 14 falls in the regenerator, the rich solution 14 becomes the semi-lean solution 15a having a smaller content of $CO_2$, and becomes the lean solution 15 which has released almost all of $CO_2$. In addition, there is a temperature distribution in which a heat temperature of the absorbent is gradually raised from the top 16a toward the bottom 16b.

In the present Example, the first supply position B-1 at an end of the first rich solution dividing line $L_{13-1}$ is a position at which the temperature $t_1$ of the semi-lean solution 15a in which a part of $CO_2$ has been removed and the temperature of which has become higher than an introduction temperature in the rich solution supply portion 16c on the top 16a side is approximately the same as the temperature $t_{11}$ of the preheated rich solution 14a which has been divided by the first rich solution heat exchanger 22-1 provided in the first rich solution dividing line $L_{13-1}$, or a position at which the temperature $t_1$ of the semi-lean solution 15a is higher.

That is, this first supply position B-1 is specified at the time of plant design. A heat distribution of the regenerator 16 is specified so that a position at which the temperature $t_1$ of the semi-lean solution 15a is approximately the same as the temperature $t_{11}$ at which the divided rich solution 14a has been preheated, or a position at which the temperature $t_1$ of the semi-lean solution 15a is higher. Therefore, in the first rich solution dividing line $L_{13-1}$, a thermometer $T_{11}$ for measuring the temperature $t_{11}$ of the divided rich solution 14a is provided to measure the temperature of the preheated divided rich solution 14a. In addition, a thermometer $T_1$ measures the temperature $t_1$ of the semi-lean solution 15a in the regenerator 16 at the first supply position B-1 for introducing the divided rich solution 14a into the regenerator 16. Here, a thermometer $T_t$ measures a liquid temperature of the rich solution 14 introduced into the rich solution supply portion 16c in the regenerator 16. A thermometer $T_b$ measures a liquid temperature of the bottom 16b.

As a result, the divided rich solution 14a is preheated and introduced into a specific position at which the temperature of the divided rich solution 14a is approximately the same as the temperature $t_1$ of the semi-lean solution 15a or is the temperature $t_{11}$ lower than the temperature $t_1$ in the regenerator 16. Therefore, variation in temperature in the regenerator 16 does not occur, $CO_2$ is released efficiently, and a high energy-saving effect can be obtained. As a result, it is possible to reduce the amount of vapor necessary for the reboiler 31 and the amount of cooling water necessary in the lean solution cooler 30 for cooling the lean solution 15 to be introduced into the absorber 13.

Figure 2:
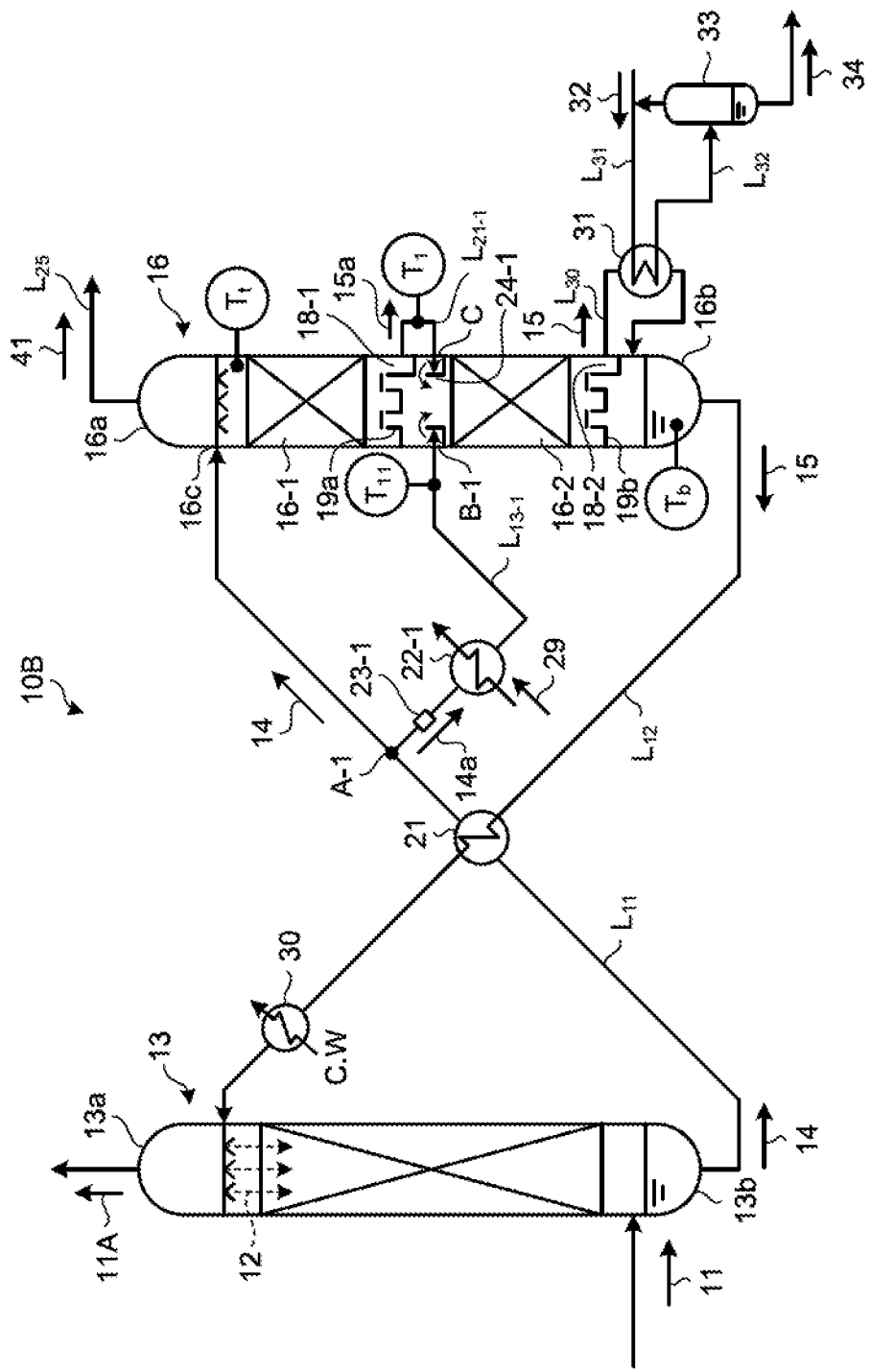
FIG. 2 is a schematic diagram illustrating a configuration of a another $CO_2$ recovery system system according to Example 1.

FIG. 2 is a schematic diagram illustrating a configuration of another $CO_2$ recovery system according to Example 1. As illustrated in FIG. 2, another $CO_2$ recovery system 10B according to the present Example includes, as illustrated in FIG. 2, a first stage regeneration unit 16-1 for regenerating the rich solution 14 as the $CO_2$ absorbent 12 in the regenerator 16 and a second stage regeneration unit 16-2 positioned below the first stage regeneration unit 16-1. The regenerator 16 includes a first semi-lean solution extraction line $L_{21-1}$ for extracting all of the semi-lean solution 15a in which a part of $CO_2$ has been removed from the rich solution 14 to an outside from a first liquid storage 18-1 of a first chimney tray 19a of the first stage regeneration unit 16-1 on an upper stage side of the regenerator 16, connected to a supply position C for supplying the extracted semi-lean solution 15a to an upper portion of the second stage regeneration unit 16-2 on a lower stage side than the extraction position, and a first mixing unit 24-1 for mixing the semi-lean solution 15a and the divided rich solution 14a in the regenerator 16, in which the supply position C in the first semi-lean solution extraction line $L_{21-1}$ in the regenerator 16 has the same height as the first supply position B-1 in the first rich solution dividing line $L_{13-1}$. Here, the mixing unit 24-1 is not particularly limited as long as having such a configuration to be able to supply the semi-lean solution 15a evenly from a facing position or four side wall directions.

For example, the phrase that the supply position C in the first semi-lean solution extraction line $L_{21-1}$ has the same height as the first supply position B-1 in the first rich solution dividing line $L_{13-1}$ does not need to be completely the same height, but only needs to be a height for making it possible to mix the semi-lean solution 15a and the rich solution 14a in the first mixing unit 24-1.

The first flow rate control device (for example, flow rate adjusting valve) 23-1 for controlling a flow rate of the divided rich solution 14a, provided between the first dividing portion A-1 and the first rich solution heat exchanger 22-1, is controlled. By controlling the first flow rate control device 23-1, the temperature $t_{11}$ of the divided and preheated rich solution 14a measured by the thermometer $T_{11}$ is made to be approximately the same as or lower than the temperature $t_1$ of the semi-lean solution 15a measured by the thermometer $T_1$ for measuring the temperature of the semi-lean solution 15a all of which is extracted, provided in the first semi-lean solution extraction line $L_{21-1}$ ($t_1 \geq t_{11}$).

As this temperature adjustment, when the actually measured temperature $t_{11}$ becomes lower than an initial setting temperature of the temperature $t_{11}$, for example, in a case of using a flow rate adjusting valve as the first flow rate control device 23-1, adjustment is performed such that the temperature $t_{11}$ actually measured by the thermometer $T_{11}$ approximates the temperature $t_1$ of the semi-lean solution 15a measured by the thermometer $T_1$ by tightening this flow rate adjusting valve, adjusting a dividing ratio, for example, changing the ratio from 90:10 as the initial setting ratio to 93:7, and raising the temperature $t_{11}$ to the initial setting temperature.

As a method of adjusting the temperature of the divided rich solution 14a, other than adjustment of the first flow rate control device 23-1, for example, when the temperature of the heat medium 29 can be changed, adjustment is performed such that the temperature of the divided rich solution 14a approximates a predetermined setting temperature by increasing the preheating amount of the divided rich solution 14a by raising the temperature of the heat medium 29 or increasing a heat exchange capacity.

As a result, by preheating and introducing the divided rich solution 14a such that the divided rich solution 14a has the temperature $t_{11}$ approximately the same as the specific predetermined temperature $t_1$ of the semi-lean solution 15a in the regenerator 16, these temperatures are approximately the same as each other at the time of mixing. Therefore, variation in temperature in the regenerator 16 does not occur, $CO_2$ is released efficiently, and a high energy-saving effect can be obtained. As a result, it is possible to reduce the amount of vapor necessary for the reboiler 31 and the amount of cooling water necessary in the lean solution cooler 30 for cooling the lean solution 15 to be introduced into the absorber 13.

This adjustment is performed by processing programmed in advance using a control device or by performed by sequential determination by a worker using a measuring meter. Here, the temperature of the $CO_2$ absorbent in the regenerator 16 means a temperature determined, for example, by a pressure in the regenerator 16, an amine enrichment of the absorbent, a boiling point depending on the kind of an amine, and a $CO_2$ enrichment in the $CO_2$ absorbent.

As described above, the present Example includes the first rich solution dividing line $L_{13-1}$ for dividing a part of the rich solution 14 to absorb $CO_2$ in the absorber 13 and to be introduced into the regenerator 16 at the first dividing portion A-1 on a later stage side of the rich/lean solution heat exchanger 21 and supplying the divided rich solution 14a, the first rich solution heat exchanger 22-1 for preheating the divided rich solution 14a, provided in the first rich solution dividing line $L_{13-1}$, and the first flow rate control device 23-1 for controlling a flow rate of the divided rich solution 14a, provided between the first dividing portion A-1 and the first rich solution heat exchanger 22-1. Energy-saving of the reboiler 31 and the lean solution cooler 30 can be performed by supplying the divided rich solution 14a at a position at which the temperature $t_1$ of the semi-lean solution 15a in a heat distribution of the regenerator 16 is approximately the same as the temperature $t_{11}$ of the divided rich solution 14a to be supplied into a middle stage in any portion (for example, near the middle stage) closer to the bottom 16b than the top 16a of the regenerator 16.

In the $CO_2$ recovery system 10B according to the present Example, illustrated in FIG. 2, an inside of the regenerator 16 is divided into two portions of the first stage regeneration unit 16-1 and the second stage regeneration unit 16-2. However, even when the inside is not divided, by preheating the divided rich solution 14a by the first rich solution heat exchanger 22-1, while adjusting a ratio of the divided rich solution 14a by controlling the first flow rate control device 23-1, and such that the temperature $t_{11}$ of the preheated divided rich solution 14a is equal to the temperature $t_1$ of the semi-lean solution 15a obtained by eliminating $CO_2$ from the rich solution 14 falling in the regenerator 16 at the first supply position B-1 for introducing the divided rich solution 14a into the regenerator 16, the temperature $t_{11}$ of the preheated divided rich solution 14a measured by the thermometer $T_{11}$ can be approximately the same as or lower than the temperature $t_1$ of the semi-lean solution 15a measured by the thermometer $T_1$ for measuring the temperature of the semi-lean solution 15a not to be extracted ($t_1 \geq t_{11}$).

Figure 3:
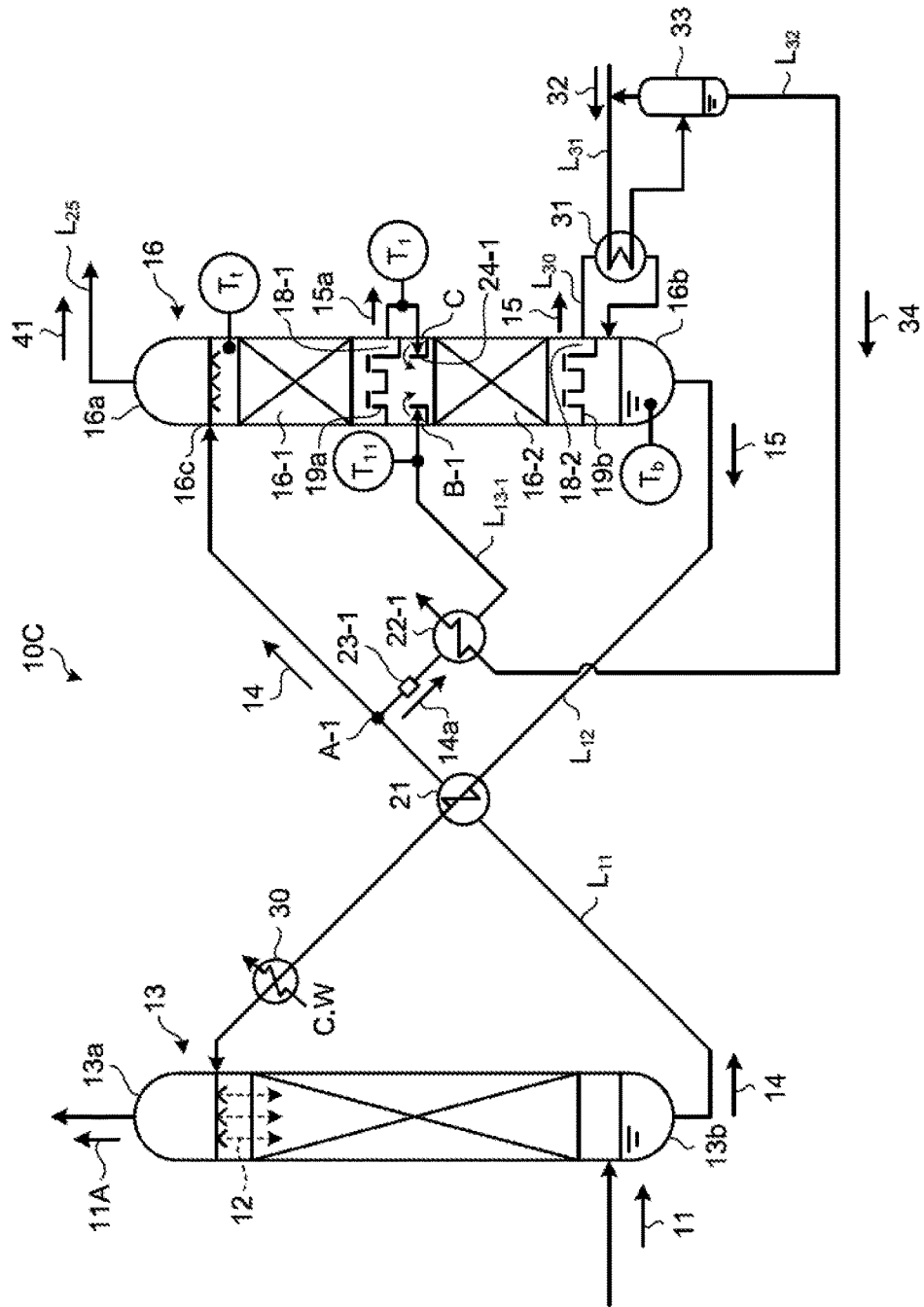
FIG. 3 is a schematic diagram illustrating a configuration of another $CO_2$ recovery system according to Example 1.

FIG. 3 is a schematic diagram illustrating a configuration of another $CO_2$ recovery system according to Example 1. As illustrated in FIG. 3, another $CO_2$ recovery system 10C according to the present Example uses the steam condensate 34 as the heat medium 29 used in the first rich solution heat exchanger 22-1. In the present Example, the steam condensate supply line $L_{32}$ for supplying the steam condensate 34 separated by the gas-liquid separator 33 is connected to the first rich solution heat exchanger 22-1, and the steam condensate 34 is used for preheating the divided rich solution 14a. As a result, the steam condensate 34 is used as the heat medium 29 used in the first rich solution heat exchanger 22-1. Therefore, supply of a heat medium from an outside can be omitted, and a regeneration efficiency of the regenerator 16 can be improved.

Example 2

Figure 4:
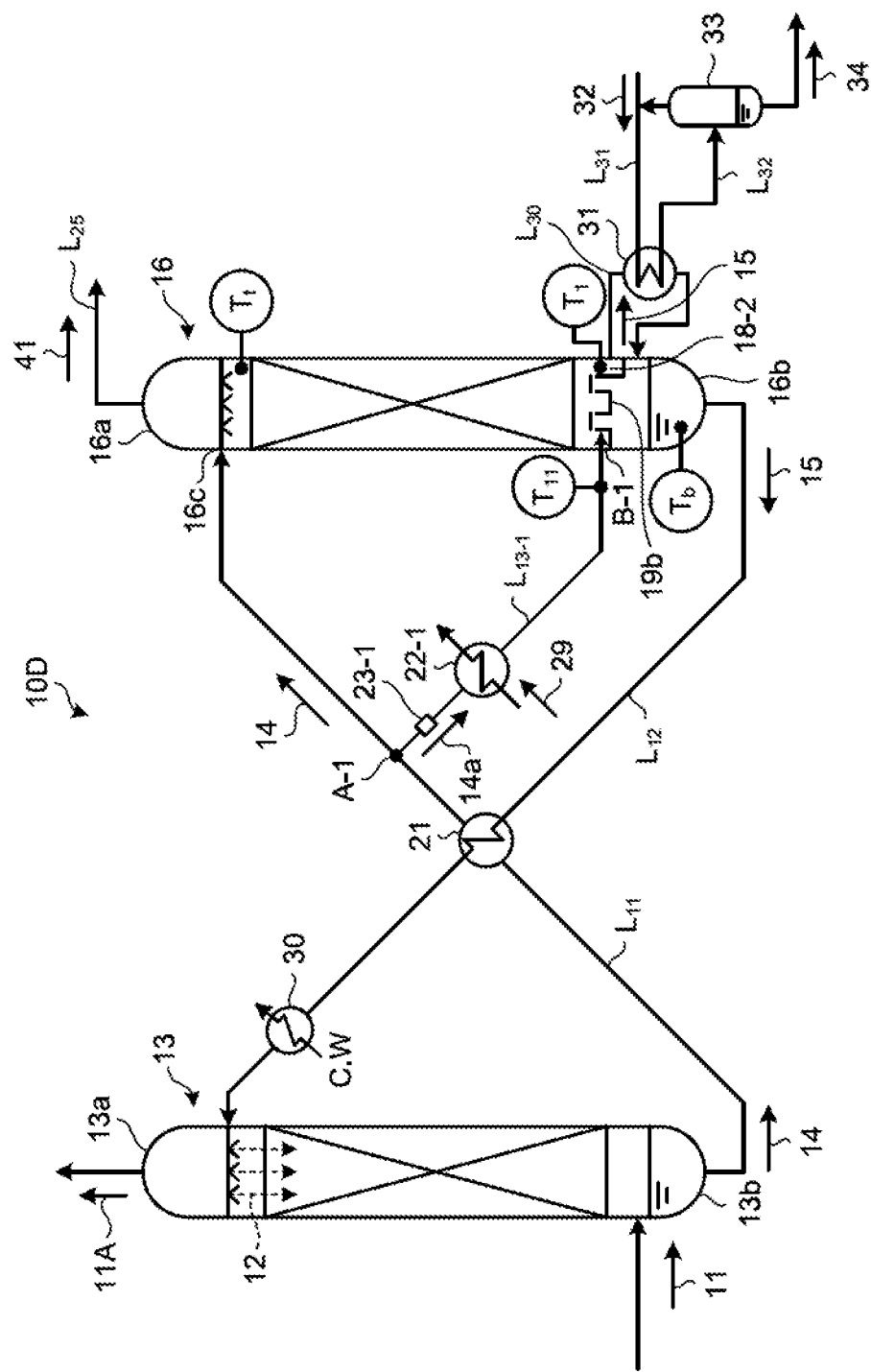
FIG. 4 is a schematic diagram illustrating a configuration of a $CO_2$ recovery system according to Example 2.

FIG. 4 is a schematic diagram illustrating a configuration of a $CO_2$ recovery system according to Example 2. As illustrated in FIG. 4, in a $CO_2$ recovery system 10D according to the present Example, an end of the first rich solution dividing line $L_{13-1}$ is connected to a second liquid storage 18-2 of a second chimney tray 19b for extracting the lean solution 15 into the reboiler 31 at the bottom 16b of the regenerator 16, and the divided rich solution 14a is supplied at the first supply position B-1.

The first flow rate control device (for example, flow rate adjusting valve) 23-1 for controlling a flow rate of the divided rich solution 14a, provided between the first dividing portion A-1 and the first rich solution heat exchanger 22-1, is controlled. By controlling the first flow rate control device 23-1, the temperature $t_{11}$ of the preheated divided rich solution 14a measured by the thermometer $T_{11}$ is made to be approximately the same as or lower than the temperature $t_1$ of the lean solution 15 measured by the thermometer $T_1$ for measuring the temperature of the lean solution 15 in the second liquid storage 13-2 ($t_1 \geq t_{11}$).

In the present Example, as the heat medium 29 for heat exchange supplying to the first rich solution heat exchanger 22-1, as in Example 1, the steam condensate 34 separated by the gas-liquid separator 33 may be used through the steam condensate supply line $L_{32}$.

As a result, by preheating and introducing the divided rich solution 14a such that the divided rich solution 14a has the temperature $t_{11}$ approximately the same as the specific predetermined temperature $t_1$ in the regenerator 16, variation in temperature in the regenerator 16 does not occur, $CO_2$ is released efficiently, and a high energy-saving effect can be obtained. As a result, it is possible to reduce the amount of vapor necessary for the reboiler 31 and the amount of cooling water necessary in the lean solution cooler 30 for cooling the lean solution 15 to be introduced into the absorber 13. In addition, stay time of the absorbent is reduced in the regenerator 16, and therefore deterioration of the absorbent by heat can be reduced.

Example 3

Figure 5:
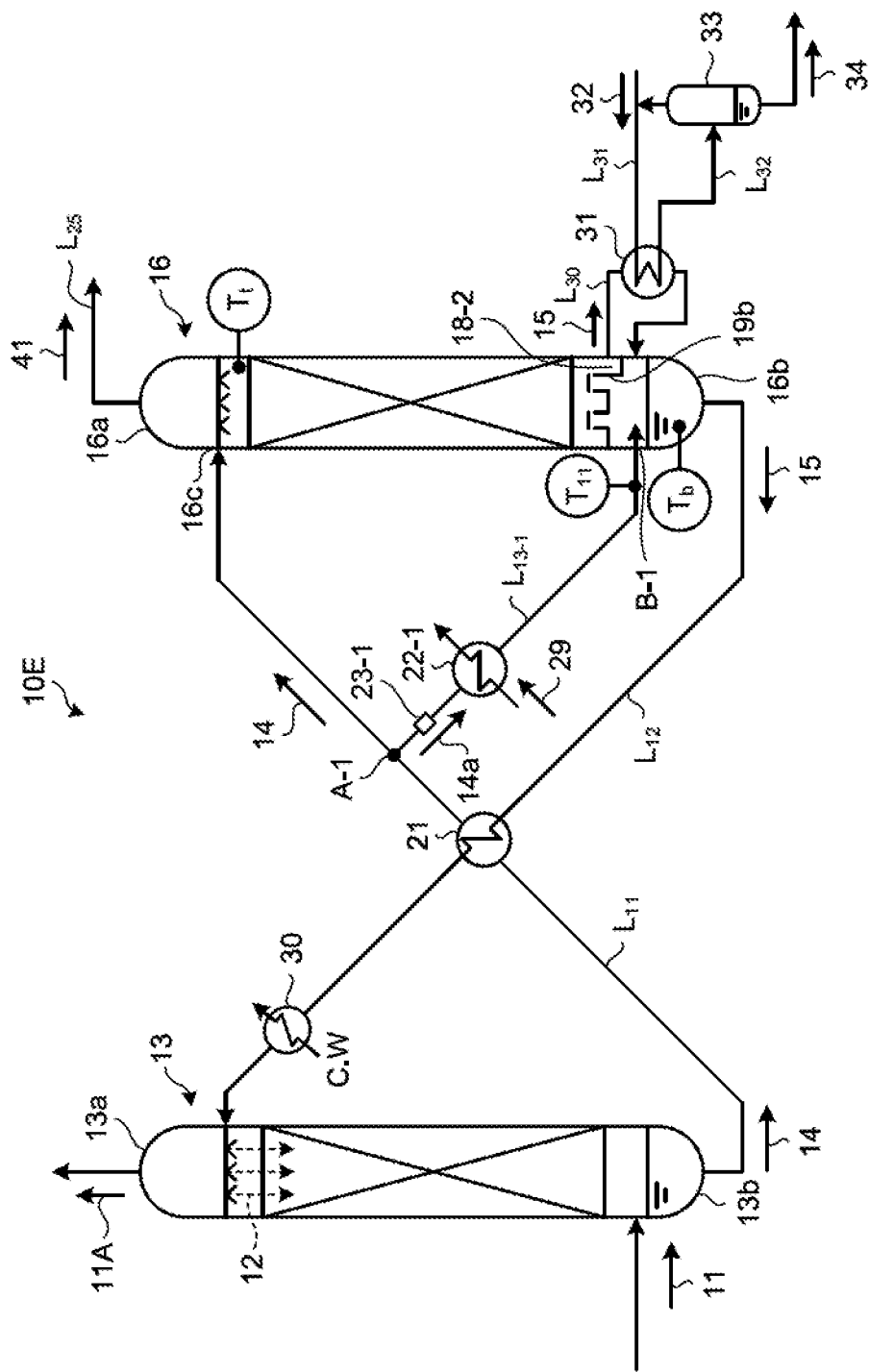
FIG. 5 is a schematic diagram illustrating a configuration of a $CO_2$ recovery system according to Example 3.

FIG. 5 is a schematic diagram illustrating a configuration of a $CO_2$ recovery system according to Example 3. As illustrated in FIG. 5, in a $CO_2$ recovery system 10E according to the present Example, an end of the first rich solution dividing line $L_{13-1}$ is connected to an inside of a liquid storage at the bottom 16b, into which the lean solution 15 heated by the reboiler 31 on the bottom 16b side of the regenerator 16 is introduced, and the divided rich solution 14a is supplied at the first supply position B-1.

The first flow rate control device (for example, flow rate adjusting valve) 23-1 for controlling a flow rate of the divided rich solution 14a, provided between the first dividing portion A-1 and the first rich solution heat exchanger 22-1, is controlled. By controlling the first flow rate control device 23-1, the temperature $t_{11}$ of the preheated divided rich solution 14a measured by the thermometer $T_{11}$ is made to be approximately the same as or lower than a temperature $t_b$ of the lean solution 15 measured by a thermometer $T_b$ for measuring the temperature of the lean solution 15 in the liquid storage at the bottom 16b ($t_b \geq t_{11}$).

As a result, by preheating and introducing the divided rich solution 14a such that the divided rich solution 14a has the temperature $t_{11}$ approximately the same as the specific predetermined temperature $t_b$ at the bottom 16b of the regenerator 16, variation in temperature in the regenerator 16 does not occur, $CO_2$ is released efficiently, and a high energy-saving effect can be obtained. As a result, it is possible to reduce the amount of vapor necessary for the reboiler 31 and the amount of cooling water necessary in the lean solution cooler 30 for cooling the lean solution 15 to foe introduced into the absorber 13. In addition, stay time of the absorbent is reduced in the regenerator 16, and therefore deterioration of the absorbent by heat can be reduced.

In the present Example, as the heat medium 29 to be supplied to the first rich solution heat exchanger 22-1 for heat exchange, as in Example 1, the steam condensate 34 separated by the gas-liquid separator 33 may be used through the steam condensate supply line $L_{32}$.

Example 4

Figure 6:
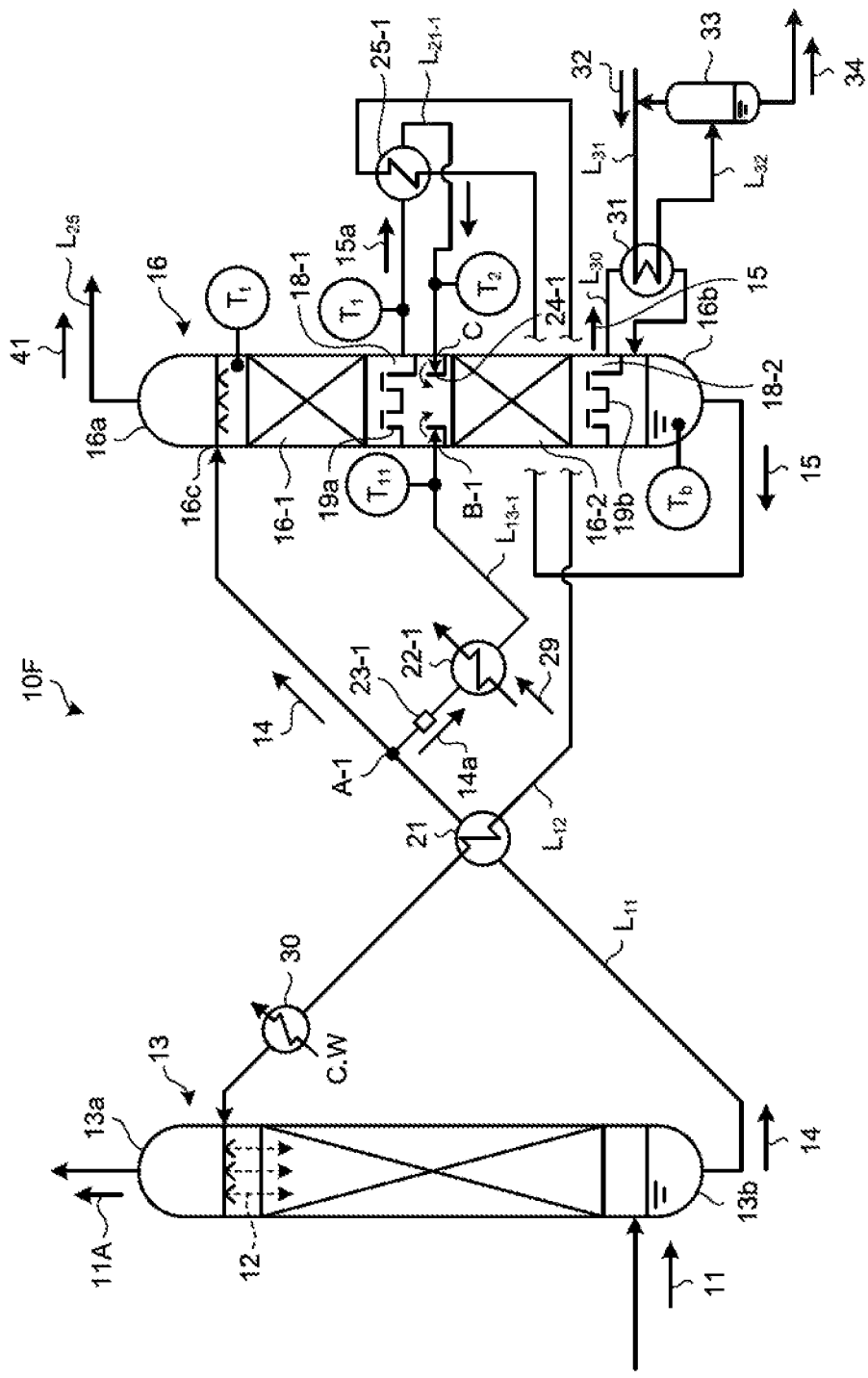
FIG. 6 is a schematic diagram illustrating a configuration of a $CO_2$ recovery system according to Example 4.

FIG. 6 is a schematic diagram illustrating a configuration of a $CO_2$ recovery system according to Example 4. As illustrated in FIG. 6, in a $CO_2$ recovery system 10F according to the present Example, a first lean/semi-lean solution heat exchanger 25-1 for exchanging heat between the lean solution 15 and the semi-lean solution 15a is provided at an intersection between the lean solution supply line $L_{12}$ and the first semi-lean solution extraction line $L_{21-1}$ between the bottom 16b in the regenerator 16 in the lean solution supply line $L_{12}$ and the rich/lean solution heat exchanger 21 in the $CO_2$ recovery system 10A illustrated in FIG. 1.

By disposing this first lean/semi-lean solution heat exchanger 25-1, the semi-lean solution 15a is preheated by the lean solution 15, and a temperature for introducing the semi-lean solution 15a is raised to $t_2$ ($t_1 + \alpha°$ C.) by measurement with a thermometer $T_2$ when an extraction temperature of the semi-lean solution 15a is $t_1$ by measurement with the thermometer $T_1$.

The first flow rate control device (for example, flow rate adjusting valve) 23-1 for controlling a flow rate of the divided rich solution 14a, provided between the first dividing portion A-1 and the first rich solution heat exchanger 22-1, is controlled. By controlling the first flow rate control device 23-1, the temperature $t_{11}$ of the preheated divided rich solution 14a measured by the thermometer $T_{11}$ is made to be approximately the same as or lower than the temperature $t_2$ of the semi-lean solution 15a measured by the thermometer $T_2$ for measuring the temperature of the preheated semi-lean solution 15a all of which is extracted, provided in the first semi-lean solution extraction line $L_{21-1}$ ($t_2 \geq t_{11}$).

According to the present Example, the semi-lean solution 15a which has been extracted outside is subjected to heat exchange with the lean solution 15. Therefore, the semi-lean solution 15a to be introduced again into the regenerator 16 can be heated, and more energy-saving in a reboiler efficiency of the regenerator 16 can be thereby performed than the $CO_2$ recovery system 10A in Example 1. In addition, if is possible to reduce the amount of cooling water necessary in the lean solution cooler 30 for cooling the lean solution 15 to be introduced into the absorber 13.

In the present Example, as the heat medium 29 to be supplied to the first rich solution heat exchanger 22-1 for heat exchange, as in Example 1, the steam condensate 34 separated by the gas-liquid separator 33 may be used through the steam condensate supply line $L_{32}$.

Example 5

Figure 7:
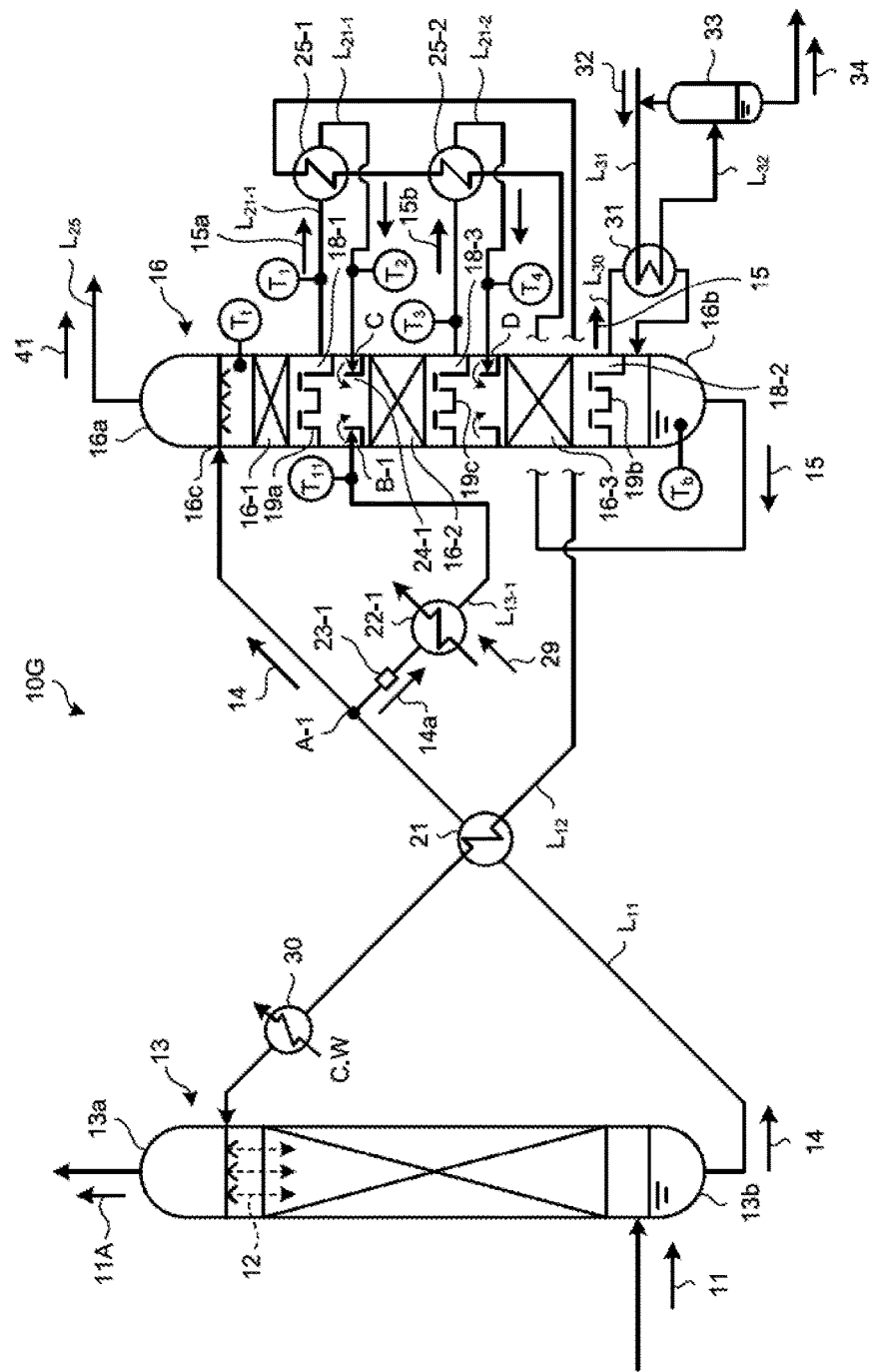
FIG. 7 is a schematic diagram illustrating a configuration of a $CO_2$ recovery system according to Example 5.

FIG. 7 is a schematic diagram illustrating a configuration of a $CO_2$ recovery system according to Example 5. As illustrated in FIG. 7, a $CO_2$ recovery system 10G according to the present Example includes the first stage regeneration unit 16-1 for regenerating the rich solution 14 as a $CO_2$ absorbent in the regenerator 16, the second stage regeneration unit 16-2 positioned below the first stage regeneration unit 16-1, and a third stage regeneration unit 16-3 positioned below the second stage regeneration unit 16-2, unlike the $CO_2$ recovery system 10A illustrated in FIG. 1. The regenerator 16 includes the first semi-lean solution extraction line $L_{21-1}$ for extracting all of the semi-lean solution 15a from the first liquid storage 18-1 for storing the semi-lean solution 15a in which a part of $CO_2$ has been removed from the rich solution 14 by the first stage regeneration unit 16-1 to an outside, connected to the supply position C for supplying the extracted semi-lean solution 15a to an upper portion of the second stage regeneration unit 16-2 on a lower stage side than the extraction position, the first mixing unit 24-1 for mixing the semi-lean solution 15a and the divided rich solution 14a in the regenerator 16, in which the supply position C in the first semi-lean solution extraction line $L_{21-1}$ has the same height as the first supply position B-1 in the first rich solution dividing line $L_{13-1}$, and a second semi-lean solution extraction line $L_{21-2}$ for extracting a semi-lean solution 15b in which a part of $CO_2$ has been further removed from the semi-lean solution 15a by the second stage regeneration unit 16-2 from a third liquid storage 18-3 of a third chimney tray 19c for storing the semi-lean solution 15b to an outside, connected to a supply position D for supplying the extracted semi-lean solution 15b to an upper portion of the third stage regeneration unit 16-3 on a lower stage side than the extraction position.

In addition, the present Example includes the first lean/semi-lean solution heat exchanger 25-1 for exchanging heat between the lean solution 15 and the semi-lean solution 15a at an intersection between the lean solution supply line $L_{12}$ and the first semi-lean solution extraction line $L_{21-1}$, and a second lean/semi-lean solution heat exchanger 25-2 for exchanging heat between the lean solution 15 and the semi-lean solution 15b at an intersection between the lean solution supply line $L_{12}$ and the second semi-lean solution extraction line $L_{21-2}$, between the bottom 16b of the regenerator 16 in the lean solution supply line $L_{12}$ and the rich/lean solution heat exchanger 21.

By disposing this first lean/semi-lean solution heat exchanger 25-1 and the second lean/semi-lean solution heat exchanger 25-2, each of the semi-lean solutions 15a is preheated by the lean solution 15, and a temperature for introducing the semi-lean solution 15a is raised to $t_2$ by measurement with the thermometer $T_2$ when an extraction temperature of the semi-lean solution 15a is $t_1$ by measurement with the thermometer $T_1$. In addition, a temperature for introducing the semi-lean solution 15b is raised to $t_4$ by measurement with a thermometer $T_4$ when an extraction temperature of the semi-lean solution 15b is $t_3$ by measurement with a thermometer $T_3$.

The first flow rate control device (for example, flow rate adjusting valve) 23-1 for controlling a flow rate of the divided rich solution 14a, provided between the first dividing portion A-1 and the first rich solution heat exchanger 22-1, is controlled. By controlling the first flow rate control device 23-1, the temperature $t_{11}$ of the preheated divided rich solution 14a measured by the thermometer $T_{11}$ is made to be approximately the same as or lower than the temperature $t_2$ of the semi-lean solution 15a measured by the thermometer $T_2$ for measuring the temperature of the semi-lean solution 15a all of which is extracted, provided in the first semi-lean solution extraction line $L_{21-1}$ ($t_2 \geq t_{11}$).

According to the present Example, an inside of the regenerator 16 is divided into three portions, and each of the semi-lean solutions 15a which have been extracted outside twice is subjected to heat exchange with the lean solution 15. Therefore, the semi-lean solution 15a to be introduced again into the regenerator 16 can be heated, and more energy-saving in a reboiler efficiency of the regenerator 16 can be thereby performed than the $CO_2$ recovery system 10A in Example 1. In addition, it is possible to reduce the amount of cooling water necessary in the lean solution cooler 30 for cooling the lean solution 15 to be introduced into the absorber 13.

In the present Example, as the heat medium 29 to be supplied to the first rich solution heat exchanger 22-1 for heat exchange, as in Example 1, the steam condensate 34 separated by the gas-liquid separator 33 may be used through the steam condensate supply line $L_{32}$.

Example 6

Figure 8:
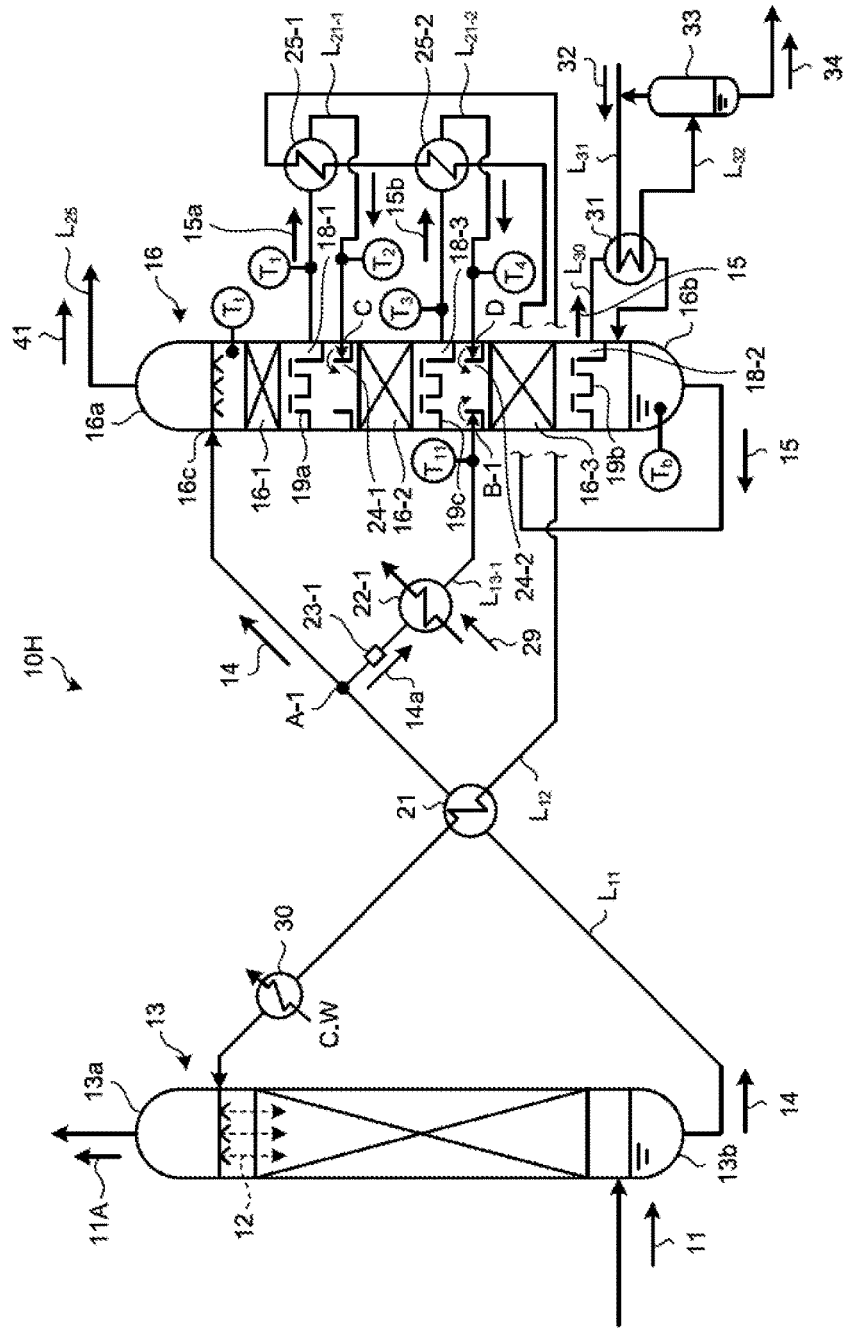
FIG. 8 is a schematic diagram illustrating a configuration of a $CO_2$ recovery system according to Example 6.

FIG. 8 is a schematic diagram illustrating a configuration of a $CO_2$ recovery system according to Example 6. As illustrated in FIG. 8, a $CO_2$ recovery system 10H according to the present Example includes the first stage regeneration unit 16-1 for regenerating the rich solution 14 as a $CO_2$ absorbent in the regenerator 16, the second stage regeneration unit 16-2 positioned below the first stage regeneration unit 16-1, and the third stage regeneration unit 16-3 positioned below the second stage regeneration unit 16-2. The regenerator 16 includes the first semi-lean solution extraction line $L_{21-1}$ for extracting all of the semi-lean solution 15a from the first liquid storage 18-1 for storing the semi-lean solution 15a in which a part of $CO_2$ has been removed from the rich solution 14 by the first stage regeneration unit 16-1 to an outside, connected to the supply position C for supplying the extracted semi-lean solution 15a to an upper portion of the second stage regeneration unit 16-2 on a lower stage side than the extraction position, the second semi-lean solution extraction line $L_{21-2}$ for extracting the semi-lean solution 15b from the third liquid storage 18-3 for storing the semi-lean solution 15b in which a part of $CO_2$ has been further removed from the semi-lean solution 15a by the second stage regeneration unit 16-2 to an outside and supplying the extracted semi-lean solution 15b at the supply position D for supply in an upper portion of the third stage regeneration unit 16-3 on a lower stage side than the extraction position, and a second mixing unit 24-2 for mixing the semi-lean solution 15b and the divided rich solution 14a in the regenerator 16, in which the supply position D in the second semi-lean solution extraction line $L_{21-1}$ has the same height as the first supply position B-1 in the first rich solution dividing line $L_{13-1}$.

In the present Example, the first flow rale control device (for example, flow late adjusting valve) 23-1 for controlling a flow rate of the divided rich solution 14a, provided between the first dividing portion A-1 and the first rich solution heat exchanger 22-1, is controlled unlike in Example 5. By controlling the first flow rate control device 23-1, the temperature $t_{11}$ of the preheated divided rich solution 14a measured by the thermometer $T_{11}$ is made to be approximately the same as or lower than a temperature $t_4$ of the semi-lean solution 15b measured by a thermometer $T_4$ for measuring the temperature of the semi-lean solution 15b all of which is extracted, provided in the second semi-lean solution extraction line $L_{21-2}$ ($t_4 \geq t_{11}$).

According to the present Example, an inside of the regenerator 16 is divided into three portions, and the semi-lean solutions 15a and 15b which have been extracted outside twice are subjected to heat exchange with the lean solution 15 using the first lean/semi-lean solution heat exchanger 25-1 and the second lean/semi-lean solution heat exchanger 25-2, respectively. Therefore, each of the semi-lean solutions 15a and 15b to be introduced again into the regenerator 16 can be heated, and more energy-saving in a reboiler efficiency of the regenerator 16 can be thereby performed than the $CO_2$ recovery system 10A in Example 1. In addition, it is possible to reduce the amount of cooling water necessary in the lean solution cooler 30 for cooling the lean solution 15 to foe introduced into the absorber 13.

In the present Example, as the heat medium 29 to be supplied to the first rich solution heat exchanger 22-1 for heat exchange, as in Example 1, the steam condensate 34 separated by the gas-liquid separator 33 may be used through the steam condensate supply line $L_{32}$.

Example 7

Figure 9:
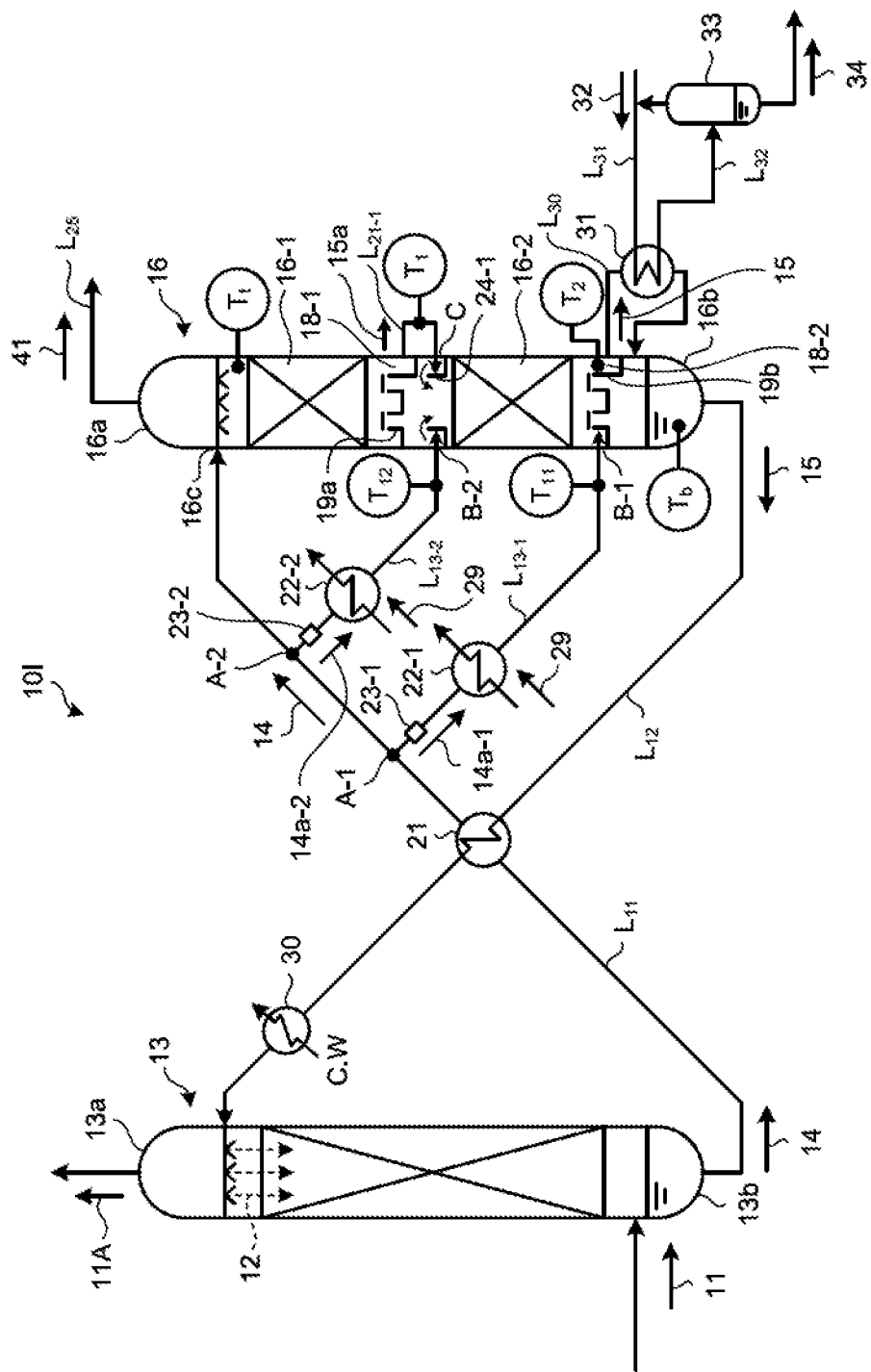
FIG. 9 is a schematic diagram illustrating a configuration of a $CO_2$ recovery system according to Example 7.

FIG. 9 is a schematic diagram illustrating a configuration of a $CO_2$ recovery system according to Example 7. As illustrated in FIG. 9, in a $CO_2$ recovery system 10I according to the present Example, a second dividing portion A-2 is provided between the first dividing portion A-1 in the rich solution supply line $L_{11}$ and the regenerator 16 in the $CO_2$ recovery system 10A in Example 1. The $CO_2$ recovery system 10I includes a second rich solution dividing line $L_{13\text{-}2}$ for further dividing a part of the rich solution 14 at the second dividing portion A-2 and supplying a divided rich solution 14a-2 to a second supply position B-2 from a side wall on the top 16a side of the first supply position B-1 in the first rich solution dividing line $L_{13\text{-}1}$ on the bottom 16b side of the rich solution supply portion 16c at the top 16a of the regenerator 16, a second rich solution heat exchanger 22-2 for preheating the rich solution 14a-2 divided at the second dividing portion A-2, provided in the second rich solution dividing line $L_{13\text{-}2}$, and a second flow rate control device 23-2 for controlling a flow rate of the rich solution 14a-2 divided at the second dividing portion A-2, provided between the second dividing portion A-2 in the second rich solution dividing line $L_{13\text{-}2}$ and the second rich solution heat exchanger 22-2.

According to the present Example, the rich solution 14 which has been subjected to heat exchange by the rich/lean solution heat exchanger 21 is divided at two positions of the first and second dividing portions A-1 and A-2, a divided rich solutions 14a-1 and 14a-2 are preheated by the first rich solution heat exchanger 22-1 and the second rich solution heat exchanger 22-2, and are introduced into the first supply position B-1 and the second supply position B-2 in the regenerator 16, respectively.

The second flow rate control device (for example, flow rate adjusting valve) 23-2 for controlling a flow rate of the divided rich solution 14a-2, provided between the second dividing portion A-2 and the second rich solution heat exchanger 22-2, is controlled. By controlling the second flow rate control device 23-2, a temperature $t_{12}$ of the preheated divided rich solution 14a-2 measured by a thermometer $T_{12}$ is made to be approximately the same as or lower than the temperature $t_1$ of the semi-lean solution 15a measured by the thermometer $T_1$ for measuring the temperature of the semi-lean solution 15a all of which is extracted, provided in the first semi-lean solution extraction line $L_{21\text{-}1}$ ($t_1 \geq t_{11}$).

Furthermore, the first flow rate control device (for example, flow rate adjusting valve) 23-1 for controlling a flow rate of the divided rich solution 14a-1, provided between the first dividing portion A-1 and the first rich solution heat exchanger 22-1, is controlled. By controlling the first flow rate control device 23-1, the temperature $t_{11}$ of the preheated divided rich solution 14a-1 measured by the thermometer $T_{11}$ is made to be approximately the same as or lower than the temperature $t_2$ of the semi-lean solution 15a measured by the thermometer $T_2$ for measuring the temperature of the lean solution 15 to be extracted to the reboiler 31 of the regenerator 16 ($t_2 \geq t_{11}$).

As in the present Example, by disposing two dividing portions of the rich solution 14, energy-saving in a reboiler efficiency can foe performed. In addition, it is possible to reduce the amount of cooling water necessary in the lean solution cooler 30 for cooling the lean solution 15 to be introduced into the absorber 13.

In the present Example, as the heat medium to be supplied to the first rich solution heat exchanger 22-1 for heat exchange, as in Example 1, the steam condensate 34 separated by the gas-liquid separator 33 may be used through the steam condensate supply line $L_{32}$.

Furthermore, as the heat medium 29 for heat exchange supplying to the second rich solution heat exchanger 22-2, the steam condensate 34 after heat exchange by the second rich solution heat exchanger 22-2 may be used.

Example 8

Figure 10:
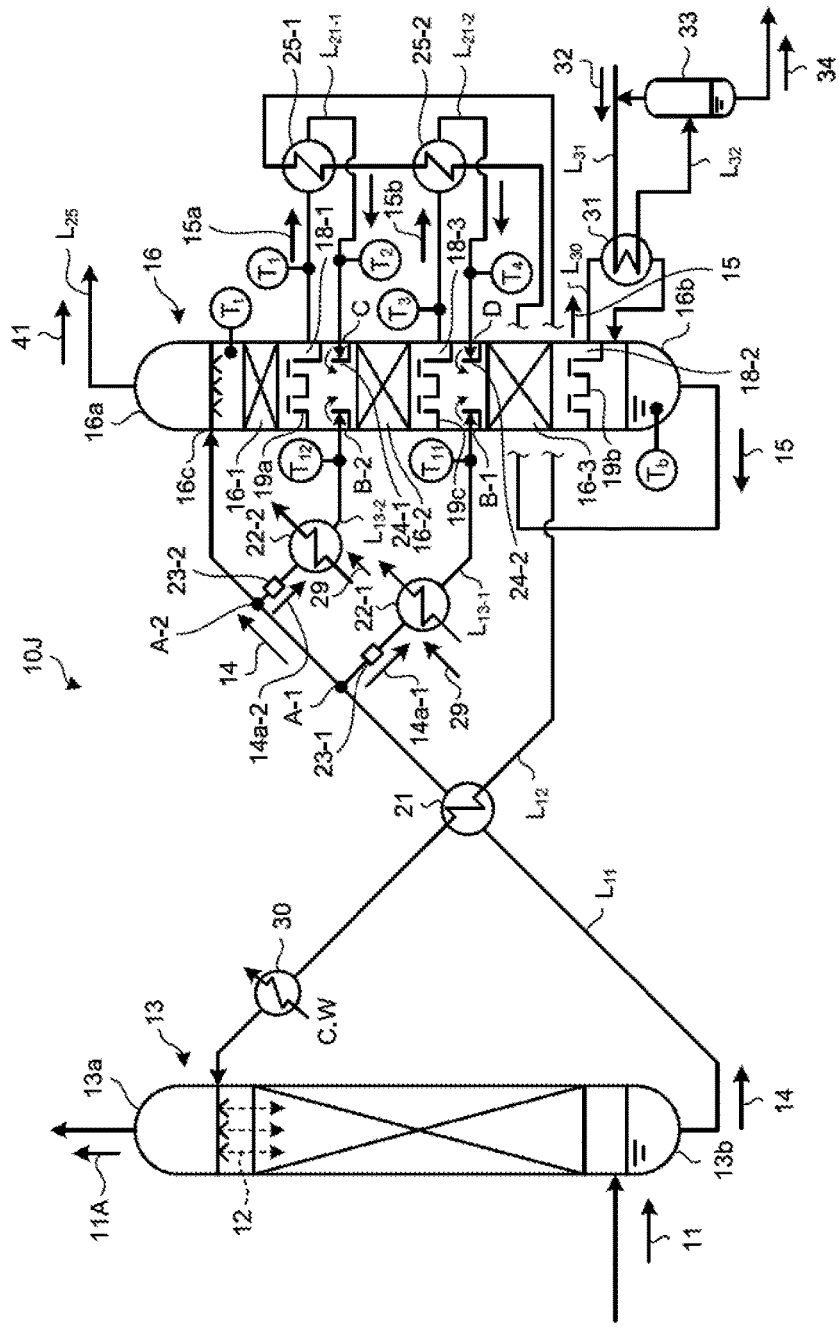
FIG. 10 is a schematic diagram illustrating a configuration of a $CO_2$ recovery system according to Example 8.

FIG. 10 is a schematic diagram illustrating a configuration of a $CO_2$ recovery system according to Example 8. As illustrated in FIG. 10, in a $CO_2$ recovery system 10J according to the present Example, the second dividing portion A-2 is provided between the first dividing portion A-1 in the rich solution supply line $L_{11}$ and the regenerator 16 in the $CO_2$ recovery system 10H in Example 6. The $CO_2$ recovery system 10J includes the second rich solution dividing line $L_{13\text{-}2}$ for further dividing a part of the rich solution 14 at the second dividing portion A-2 and supplying the divided part of rich solution 14a-2 to any second supply position B-2 on a side wall on the top 16a side of the first first supply position B-1 in the first rich solution dividing line $L_{13\text{-}1}$ on the bottom 16b side of the rich solution supply portion 16c in the regenerator 16, the second rich solution heat exchanger 22-2 for preheating the rich solution 14a-2 divided at the second dividing portion A-2, provided in the second rich solution dividing line $L_{13\text{-}2}$, the second flow rate control device 23-2 for controlling a flow rate of the rich solution 14a-2 divided at the second dividing portion A-2, provided between the second dividing portion A-2 in the second rich solution dividing line $L_{13\text{-}2}$ and the second rich solution heat exchanger 22-2, and the first mixing unit 24-1 for mixing the semi-lean solution 15b and the divided rich solution 14a-2 in the regenerator 16, in which the supply position C in the first semi-lean solution extraction line $L_{21\text{-}1}$ has approximately the same height as the second supply position B-2 in the second rich solution dividing line $L_{13\text{-}2}$.

According to the present Example, the rich solution 14 which has been subjected to heat, exchange by the rich/lean solution heat exchanger 21 is divided at two positions of the first and second dividing portions A-1 and A-2, the divided and divided rich solutions 14a-1 and 14a-2 are preheated by the first rich solution heat exchanger 22-1 and the second rich solution heat exchanger 22-2, and are introduced into the first supply position B-1 and the second supply position B-2 in the regenerator 16, respectively.

The second flow rate control device (for example, flow rate adjusting valve) 23-2 for controlling a flow rate of the divided rich solution 14a, provided between the second dividing portion A-2 and the second rich solution heat exchanger 22-2, is controlled. By controlling the second flow rate control device 23-2, the temperature $t_{12}$ of the preheated divided rich solution 14a-2 measured by the thermometer $T_{12}$ is made to be approximately the same as or lower than the temperature $t_2$ of the semi-lean solution 15a measured by the thermometer $T_2$ for measuring the temperature of the semi-lean solution 15a all of which is extracted, provided in the first semi-lean solution extraction line $L_{21\text{-}1}$ ($t_2 \geq t_{12}$).

The first flow rate control device (for example, flow rate adjusting valve) 23-1 for controlling a flow rate of the divided rich solution 14a-1, provided between the first dividing portion A-1 and the first rich solution heat exchanger 22-1, is controlled. By controlling the first flow rate control device 23-1, the temperature $t_{11}$ of the preheated divided rich solution 14a-1 measured by the thermometer $T_{11}$ is made to be approximately the same as or lower than the temperature $t_4$ of the semi-lean solution 15a measured by the thermometer $T_4$ for measuring the temperature of the semi-lean solution 15b all of which is extracted, provided in the second semi-lean solution extraction line $L_{21-2}$ ($t_4 \geq t_{11}$).

By disposing two dividing portions of the rich solution 14, energy-saving in a reboiler efficiency can be performed. In addition, it is possible to reduce the amount of cooling water necessary in the lean solution cooler 30 for cooling the lean solution 15 to be introduced into the absorber 13.

In the present Example, as the heat medium 29 to be supplied to the first rich solution heat exchanger 22-1 for heat exchange, as in Example 1, the steam condensate 34 separated by the gas-liquid separator 33 may be used through the steam condensate supply line $L_{32}$.

Furthermore, as the heat medium 29 to be supplied to the second rich solution heat exchanger 22-2 for heat exchange, the steam condensate 34 after heat exchange by the second rich solution heat exchanger 22-2 may be used.

Test Examples 1 to 8

Tests for confirming effects of Examples 1 to 8 in the present invention were performed.

That is, as in prior art, comparison in a heat amount of the reboiler 31 and a cooling efficiency of the lean solution cooler 30 was made when a part of the rich solution 14 was divided at the first dividing portion A-1 on a later stage side of the rich/lean solution heat exchanger 21, was preheated, by the first rich solution heat exchanger 22-1, and then was introduced so as to have the same temperature as the semi-lean solution 15a in the regenerator 16 using devices illustrated by the $CO_2$ recovery systems 10C to 10J in Examples illustrated in FIGS. 3 to 10 while a necessary heat amount of the reboiler 31 in the regenerator 16 was assumed to be 1 and a necessary cooling amount of the lean solution cooler 30 was assumed to be 1 when the rich solution 14 was introduced from the absorber 13 into the regenerator 16 only using the rich/lean solution heat exchanger 21.

Note that the steam condensate 34 was used as the heat medium 29 used for the first rich solution heat exchanger 22-1. Table 1 indicates this result.

As indicated in Table 1, in Test Example 1 ($CO_2$ recovery system 10C in Example 1 in FIG. 3), 6% energy saving was confirmed compared with Comparative Example 1 having no division as a reference. In Test Example 2 ($CO_2$ recovery system 10D in Example 2 in FIG. 4), 6% energy saving was confirmed compared with Comparative Example 1 having no division as a reference. In Test Example 3 ($CO_2$ recovery system 10E in Example 3 in FIG. 5), 6% energy saving was confirmed compared with Comparative Example 1 having no division as a reference. In Test Example 4 ($CO_2$ recovery system 10F in Example 4 in FIG. 6), 14% energy saving was confirmed compared with Comparative Example 1 having no division as a reference. In Test Example 5 ($CO_2$ recovery system 10G in Example 5 in FIG. 7), 16% energy saving was confirmed compared with Comparative Example 1 having no division as a reference. In Test Example 6 ($CO_2$ recovery system 10H in Example 6 in FIG. 8), 17% energy saving was confirmed compared with Comparative Example 1 having no division as a reference. In Test Example 7 ($CO_2$ recovery system 10I in Example 7 in FIG. 9), 6% energy saving was confirmed compared with Comparative Example 1 having no division as a reference. In Test Example 8 ($CO_2$ recovery system 10J in Example 8 in FIG. 10), 6% energy saving was confirmed compared with Comparative Example 1 having no division as a reference. When water vapor derived from an outside was used as a heat medium of the second rich solution heat exchanger 22-2 in Test Example 9 ($CO_2$ recovery system 10J in Example 8 in FIG. 10), 7% energy saving was confirmed compared with Comparative Example 1 having no division as a reference. Furthermore, in Test Examples 4 to 6, it was confirmed that a cooling efficiency of the lean solution cooler 30 was improved to reduce the amount of cooling water.

TABLE 1

|  | Test Example | | | | | | | | | Comparative |
| --- | --- | --- | --- | --- | --- | --- | --- | --- | --- | --- |
|  | 1 | 2 | 3 | 4 | 5 | 6 | 7 | 8 | 9 | Example 1 |
| Lean solution cooler | 1.01 | 1.01 | 1.01 | 0.76 | 0.71 | 0.69 | 1.02 | 1.02 | 1.02 | 1.00 |
| Reboiler | 0.94 | 0.94 | 0.94 | 0.86 | 0.84 | 0.83 | 0.94 | 0.94 | 0.93 | 1.00 |

The invention claimed is:

1. A $CO_2$ recovery system comprising:
a $CO_2$ absorber that brings a $CO_2$-containing flue gas with a $CO_2$ absorbent and removes $CO_2$ from the $CO_2$-containing flue gas;
an absorbent regenerator that separates $CO_2$ from a rich solution which has absorbed $CO_2$ and regenerates the $CO_2$ absorbent as a lean solution;
a rich solution supply line that supplies the rich solution from a bottom of the $CO_2$ absorber to a rich solution supply portion on a top side of the absorbent regenerator;
a lean solution supply line that supplies the lean solution from a bottom of the absorbent regenerator to a lean solution supply portion of the $CO_2$ absorber;
a rich/lean solution heat exchanger that exchanges heat between the rich solution and the lean solution, provided at an intersection between the rich solution supply line and the lean solution supply line;
a first dividing portion that divides a part of the rich solution as a first divided rich solution, provided at a downstream side of the rich/lean solution heat exchanger in the rich solution supply line;
a first rich solution dividing line that is divided from the first dividing portion and connected to a first supply position on a side wall positioned lower than the rich solution supply portion on the top side of the absorbent regenerator, and supplies the first divided rich solution to the first supply position of the absorbent regenerator to which the first divided rich solution is introduced therefrom and $CO_2$ absorbent which has released a part or a large part of $CO_2$ from the rich solution falls as a semi-lean solution from the top side of the absorbent regenerator;
a first rich solution heat exchanger that preheats the first divided rich solution, provided in the first rich solution dividing line; and
a first flow rate control device that controls a flow rate of the first divided rich solution such that the rich solution is preheated to a predetermined temperature in the first rich solution heat exchanger, provided between the first dividing portion and the first rich solution heat exchanger in the first rich solution dividing line, wherein the first rich solution dividing line directly supplies rich solution to the first rich solution heat exchanger and the first rich solution heat exchanger directly supplies a heated rich solution to the first supply position of the absorbent regenerator.

2. The $CO_2$ recovery system according to claim 1, wherein a heat exchange medium in the first rich solution heat exchanger is steam condensate derived from a reboiler included in the absorbent regenerator.

3. The $CO_2$ recovery system according to claim 1, having a first stage regeneration unit that regenerates the $CO_2$ absorbent in the absorbent regenerator and a second stage regeneration unit positioned below the first stage regeneration unit, comprising:

a first semi-lean solution extraction line that extracts a first semi-lean solution in which a part of $CO_2$ has been removed from the rich solution by the first stage regeneration unit to an outside from a first liquid storage for storing the first semi-lean solution, connected to a supply position for supplying the extracted first semi-lean solution to an upper portion of the second stage regeneration unit on a lower stage side than an extraction position of the first liquid storage; and a mixing unit of the second stage regeneration unit in the absorbent regenerator that mixes the first semi-lean solution and the first divided rich solution in the absorbent regenerator, in which the supply position in the first semi-lean solution extraction line in the absorbent regenerator has the same height as the supply position in the first rich solution dividing line.

4. The $CO_2$ recovery system according to claim 3, comprising a first lean/semi-lean solution heat exchanger that exchanges heat between the lean solution and the first semi-lean solution, provided at an intersection between the lean solution supply line and the first semi-lean solution extraction line between the bottom of the absorbent regenerator in the lean solution supply line and the rich/lean solution heat exchanger.

5. The $CO_2$ recovery system according to claim 1, having a first stage regeneration unit that regenerates the $CO_2$ absorbent in the absorbent regenerator, a second stage regeneration unit positioned below the first stage regeneration unit, and a third stage regeneration unit positioned below the second stage regeneration unit, comprising:

a first semi-lean solution extraction line that extracts all of a first semi-lean solution in which a part of $CO_2$ has been removed from the rich solution by the first stage regeneration unit to an outside from a first liquid storage for storing the first semi-lean solution, connected to a supply position for supplying the extracted first semi-lean solution to an upper portion of the second stage regeneration unit on a lower stage side than an extraction position of the first liquid storage;

a mixing unit of the second stage regeneration unit in the absorbent regenerator that mixes the first semi-lean solution and the first divided rich solution in the absorbent regenerator, in which the supply position in the first semi-lean solution extraction line has the same height as the supply position in the first rich solution dividing line; and a second semi-lean solution extraction line that extracts a second semi-lean solution in which a part of $CO_2$ has been further removed from the first semi-lean solution by the second stage regeneration unit to an outside from a second liquid storage for storing the second semi-lean solution, connected to a supply position for supplying the extracted second semi-lean solution to an upper portion of the third stage regeneration unit on a lower stage side than an extraction position of the second liquid storage.

6. The $CO_2$ recovery system according to claim 1, having a first stage regeneration unit that regenerates the $CO_2$ absorbent in the absorbent regenerator, a second stage regeneration unit positioned below the first stage regeneration unit, and a third stage regeneration unit positioned below the second stage regeneration unit, comprising:

a first semi-lean solution extraction line that extracts all of a first semi-lean solution in which a part of $CO_2$ has been removed from the rich solution by the first stage regeneration unit to an outside from a first liquid storage for storing the first semi-lean solution, connected to a supply position for supplying the extracted first semi-lean solution to an upper portion of the second stage regeneration unit on a lower stage side than an extraction position of the first liquid storage;

a second semi-lean solution extraction line that extracts a second semi-lean solution in which a part of $CO_2$ has been further removed from the first semi-lean solution by the second stage regeneration unit to an outside from a second liquid storage for storing the second semi-lean solution and supplies the extracted second semi-lean solution to a supply position for supplying the extracted second-semi-lean solution to an upper portion of the third stage regeneration unit on a lower stage side than an extraction position of the second liquid storage; and a mixing unit of the third stage regeneration unit in the absorbent regenerator that mixes the second semi-lean solution and the first divided rich solution in the absorbent regenerator, in which the supply position in the second semi-lean solution extraction line has the same height as the supply position in the first rich solution dividing line.

7. The $CO_2$ recovery system according to claim 1, further comprising:

a second dividing portion that divides a part of the rich solution as a second divided rich solution, provided between the first dividing portion in the rich solution supply line and the absorbent regenerator;

a second rich solution dividing line that is connected between the second dividing portion in the rich solution supply line and a second supply position on a side wall positioned lower than the rich solution supply portion on the top side and higher than the first supply position of the absorbent regenerator and supplies the second divided rich solution to the second supply position of the absorbent regenerator;

a second rich solution heat exchanger that preheats the second rich solution, provided in the second rich solution dividing line; and a second flow rate control device that controls a flow rate of the second divided rich solution, provided between the second dividing portion and the second rich solution heat exchanger in the second rich solution dividing line.

8. The $CO_2$ recovery system according to claim 6, further having a second dividing portion provided between the first dividing portion and the absorbent regenerator, comprising:

a second rich solution dividing line that further divides a part of the rich solution at the second dividing portion and supplies the divided rich solution to any position on a side wall on a bottom side of the rich solution supply portion on the top side of the absorbent regenerator and on a top side of the first rich solution dividing line;

a second rich solution heat exchanger that preheats the rich solution divided at the second dividing portion, provided in the second rich solution dividing line;

a second flow rate control device that controls a flow rate of the rich solution divided at the second dividing portion, provided between the second dividing portion in the second rich solution dividing line and the second rich solution heat exchanger; and a mixing unit of the second stage regeneration unit in the absorbent regenerator that mixes the first semi-lean solution and the second divided rich solution in the absorbent regenerator, in which the supply position in the first semi-lean solution extraction line has the same height as the supply position in the second rich solution dividing line.

9. The $CO_2$ recovery system according to claim 8, comprising:

a first lean/semi-lean solution heat exchanger that exchanges heat between the lean solution and the first semi-lean solution, provided at an intersection between the lean solution supply line and the first semi-lean solution extraction line between the bottom of the absorbent regenerator in the lean solution supply line and the rich/lean solution heat exchanger; and a second lean/semi-lean solution heat exchanger that exchanges heat between the lean solution and the second semi-lean solution, provided at an intersection between the lean solution supply line and the second semi-lean solution extraction line.

* * * * *